United States Patent
Matsumoto et al.

[11] Patent Number: 6,035,911
[45] Date of Patent: Mar. 14, 2000

[54] PNEUMATIC TIRE INCLUDING FLUORINE BASED OLIGOMER

[75] Inventors: Hiroyuki Matsumoto; Hideki Matsui; Toshiyuki Ota; Kenji Matsuo, all of Kodaira, Japan

[73] Assignee: Bridgestone Corporation, Tokyo, Japan

[21] Appl. No.: 08/973,722

[22] PCT Filed: May 1, 1997

[86] PCT No.: PCT/JP97/01505

§ 371 Date: Dec. 5, 1997

§ 102(e) Date: Dec. 5, 1997

[87] PCT Pub. No.: WO97/42266

PCT Pub. Date: Nov. 13, 1997

[30] Foreign Application Priority Data

May 2, 1996 [JP] Japan .................................. 8/111370

[51] Int. Cl.[7] .............................. B60C 1/00; B60C 11/00
[52] U.S. Cl. ...................... 152/209.5; 524/492; 524/520; 525/199; 526/243; 526/245; 526/248
[58] Field of Search .......................... 152/209.1, 209.5, 152/905; 526/243, 245, 248; 524/492, 520; 525/199

[56] References Cited

U.S. PATENT DOCUMENTS 3,768,537  10/1973  Hess et al. ............................ 152/209.5
4,387,203   6/1983  Furuta et al. ........................... 526/245
4,596,839   6/1986  Peters ..................................... 524/520
5,580,919  12/1996  Agostini et al. ....................... 524/492

FOREIGN PATENT DOCUMENTS 58-5347      1/1983  Japan .
63-58172    11/1988  Japan .
5-208454     8/1993  Japan .
7-228638     8/1995  Japan .
WO 95/18022  7/1995  WIPO .

OTHER PUBLICATIONS

Mark et al, *Science and Technology of Rubber* pp. 432–442, 678–680, Figure 3, Figure 23, 1994.

Abstracts for 7–228638.

Abstract for 63–58172.

*Primary Examiner*—Steven D. Maki
*Attorney, Agent, or Firm*—Sughrue, Mion, Zinn, Macpeak & Seas, PLLC

[57] ABSTRACT

A rubber composition comprises one or more rubbers selected from the group consisting of natural rubber, polyisoprene rubber, styrene-butadiene copolymer rubber, polybutadiene rubber, acrylonitrile-butadiene copolymer rubber, isoprene-isobutylene copolymer rubber and ethylene-propylene-diene terpolymer rubber, and a reinforcing agent and a fluorine-based additive having a perfluoroalkyl group containing copolymer.

13 Claims, 2 Drawing Sheets

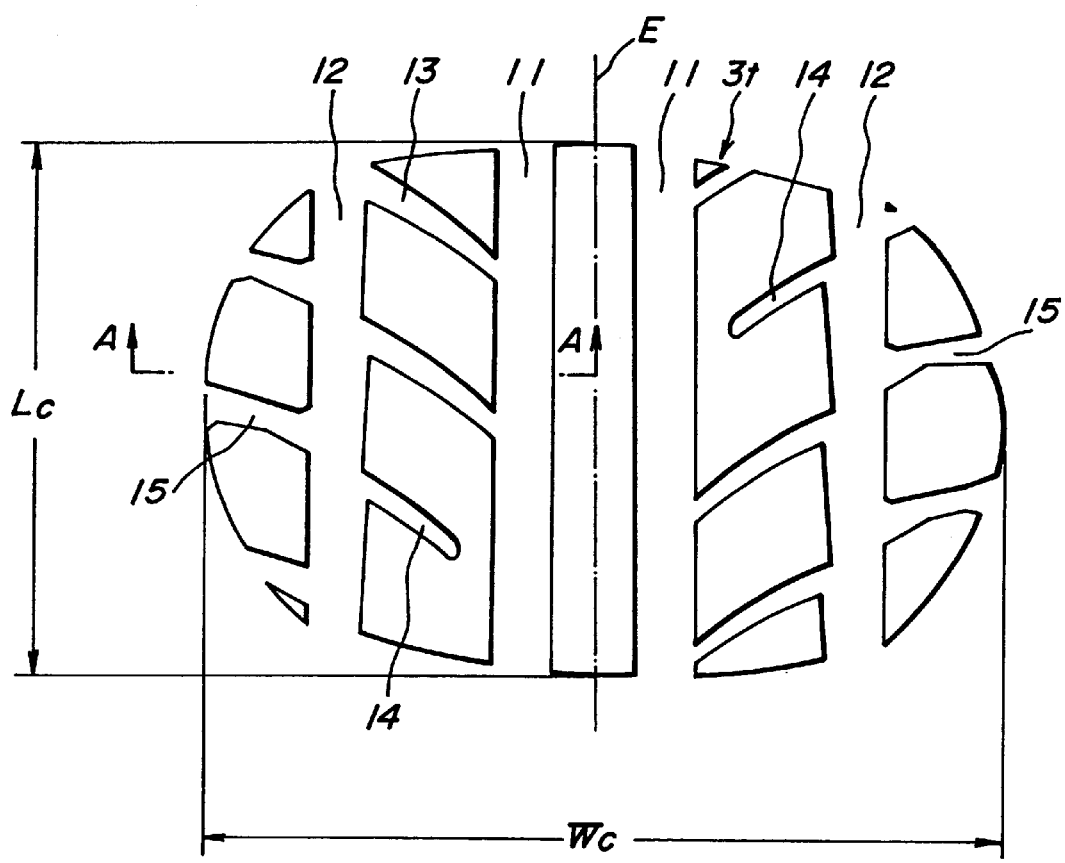
FIG_2

PNEUMATIC TIRE INCLUDING FLUORINE BASED OLIGOMER

TECHNICAL FIELD

This invention relates to a pneumatic tire primarily developing an excellent drainage property when a vehicle is run at a high speed on a road surface covered with a water film or water having a depth exceeding the water film in rainy weather or just thereafter (herein-after referred to as wet road surface) and secondarily developing an excellent steering stability when the vehicle is run at a high speed on a dry road surface.

BACKGROUND ART

Recently, the advancement of high performances in a vehicle, particularly advancement of high performances in passenger car and racing car becomes remarkable, and also it is naturally desired to considerably improve performances of a pneumatic tire to be mounted onto the vehicle in accordance with the above advancement of high performances. Especially, in case of a pneumatic radial tire for passenger car or a pneumatic racing tire, it is necessary and indispensable to considerably improve the steering stability. In this connection, it is generalized to adopt a lower-section profile tire which easily provides a large rigidity in the cornering and is advantageous in the development of a highly improved steering stability, or a tire having a smaller value of a nominal aspect ratio (flattening percentage).

However, as the flattening percentage of the tire becomes smaller, the ground contact width of the treading surface becomes wider, while the ground contact length becomes shorter, so that it is difficult to obtain a uniform ground contact pressure distribution in the widthwise direction of the treading surface and hence the drainage property being high in the dependence upon the ground contact pressure at the ground contact zone of the tire rotating on wet road surface at a higher speed is degraded and it is apt to cause so-called hydroplaning phenomenon at a vehicle speed in a relatively low speed region.

In order to shift the speed of causing the hydroplaning phenomenon to a higher speed size, it is attempted to take various means in the shape and arrangement of grooves in the treading surface of the tread portion most contributing to the improvement of the drainage property, and as a result, the resistance to hydroplaning in the tire having a small flattening percentage is improved to a certain level.

On the other hand, it is simply that the groove shape and groove arrangement define the shape and arrangement of land portions in tread rubber at the treading surface side of the tread portion, which largely affects performances other than the drainage property such as steering stability on dry road surface, resistance to uneven wear and the like. That is, the groove shape and groove arrangement capable of always establishing the drainage property and the other required performances are not necessarily obtained, and there is often caused a case that the groove shape and groove arrangement desired in view of the drainage property are incompatible with the rigidity distribution of land portions required in view of dry steering stability and resistance to uneven wear. In this case, therefore, it is obliged to naturally cause a limit in the degree of improving the drainage property through the groove shape and groove arrangement.

It is, therefore, an object of the invention to provide a pneumatic tire having a tread portion capable of establishing performances such as highly improved dry steering stability and resistance to uneven wear and an excellent resistance to hydroplaning based on a large improvement of drainage property by setting the groove shape and groove arrangement at a large freedom degree including a groove-free case (slick), and particularly pneumatic radial tire for passenger car, pneumatic radial tire for truck and bus or pneumatic racing tire.

DISCLOSURE OF INVENTION

In order to achieve the above object, the pneumatic tire according to the invention comprises a pair of bead portions, a pair of sidewall portions and a tread portion toroidally extending between both the sidewall portions and is characterized in that at least a surface layer portion of a tread rubber constituting the tread portion is a rubber composition comprising one or more rubbers selected from the group consisting of natural rubber, polyisoprene rubber, styrene-butadiene copolymer rubber, polybutadiene rubber, acrylonitrile-butadiene copolymer rubber, isoprene-isobutylene copolymer rubber and ethylene-propylene-diene terpolymer rubber, and a reinforcing agent and a fluorine-based additive having a perfluoroalkyl group containing copolymer. Moreover, the fluorine-based additive is preferable to be an oligomer form.

Although there are solution-polymerized products and emulsion-polymerized products as the styrene-butadiene copolymer rubber, the solution-polymerized styrene-butadiene copolymer rubber is better and preferable in view of the wet-skid resistance in case of the pneumatic radial tire for passenger car and in view of the resistance to blow-out in case of the pneumatic racing tire.

As the fluorine-based additive compounded in the above rubber composition, the above copolymer is preferable, but PTFE (polytetrafluoroethylene, ethylene tetrafluoride resin) or HFTMS (heptadecafluorodecyl trimethoxysilane) may be used. The amount of the fluorine-based additive compounded is desirable to be within a range of 1–20 parts by weight, particularly not less than 5 parts by weight per 100 parts by weight of rubber. The reason why the fluorine-based additive is required to have the perfluoroalkyl group containing copolymer is due to the fact that the copolymerized oligomer can be intertwined with rubber (polymer) to strengthen the bonding force between the fluorine-based additive and the rubber composition.

In the practice of the invention, it is favorably adaptable that at least a part of the reinforcing agent in the rubber composition is silica, or at least a part of the reinforcing agent is aluminum hydroxide, or the reinforcing agent includes carbon black, silica and aluminum hydroxide.

In a further preferable embodiment of the invention, a first fluorine-based additive having the perfluoroalkyl group containing copolymer in the rubber composition is a fluorine-based copolymer obtained by reacting an acetoacetyl group containing ethylenically unsaturated monomer X with a perfluoroalkyl group containing ethylenically unsaturated monomer Y, and a second fluorine-based additive having the perfluoroalkyl group containing copolymer in the rubber composition is a fluorine-based copolymer obtained by reacting an acetoacetyl group containing ethylenically unsaturated monomer X and a perfluoroalkyl group containing ethylenically unsaturated monomer Y with an ethylenically unsaturated monomer Z copolymerizable therewith.

The acetoacetyl group containing ethylenically unsaturated monomer X is an acetoacetyl group containing (metha) acrylate. The acetoacetyl group containing (metha)acrylate is practically advantageous to be at least either acetoacetoxyethyl acrylate or acetoacetoxyethyl methacrylate.

Here, (metha)acrylate is an expression of including both acrylate and methacrylate. For example, the acetoacetyl group containing (metha)acrylate means to include both acetoacetyl group containing acrylate and acetoacetyl group containing methacrylate.

Further, the perfluoroalkyl group containing ethylenically unsaturated monomer Y is desirable to be a compound represented by the following general formula (I):

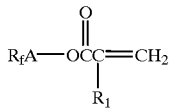

(I)

[wherein $R_f$ is a perfluroalkyl group having a carbon number of 4–20, $R_1$ is —H or —$CH_3$, A is —Q—, —CON ($R_2$)—Q—, or —$SO_2N(R_2)$—Q— (wherein —Q— is an alkylene group having a carbon number of 1–10, and $R_2$ is an alkyl group having a carbon number of 1–4].

Moreover, the copolymerizable ethylenically unsaturated monomer Z is desirable to be a straight-chain or branched-chain alkyl group containing (metha)acrylate having a carbon number of 14–24.

The straight-chain or branched-chain alkyl group containing (metha)acrylate having a carbon number of 14–24 is desirable to be a compound represented by the following general formula (II):

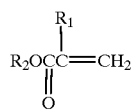

(II)

(wherein $R_1$ is —H or —$CH_3$, and $R_2$ is a straight-chain or branched-chain alkyl group having a carbon number of 14–24).

And also, it is preferable that a weight ratio of acetoacetyl group containing ethylenically unsaturated monomer X to perfluoroalkyl group containing ethylenically unsaturated monomer Y is 1~30:70~99, and a weight ratio of acetoacetyl group containing ethylenically unsaturated monomer X to perfluoroalkyl group containing ethylenically unsaturated monomer Y to ethylenically unsaturated monomer Z copolymerizable therewith is 1~30:40~80:10~50.

In the practice of the invention, it is further suitable that the fluorine-based additive is an oligomer form and a silicon oxide and a silane coupling agent are compounded with the rubber composition.

BEST MODE FOR CARRYING OUT THE INVENTION

An embodiment of carrying out the invention will be described in detail with reference to FIG. 1 and FIG. 2 below.

FIG. 2 is a profile view of a foot print of the tire shown in FIG. 1.

Figure 1:
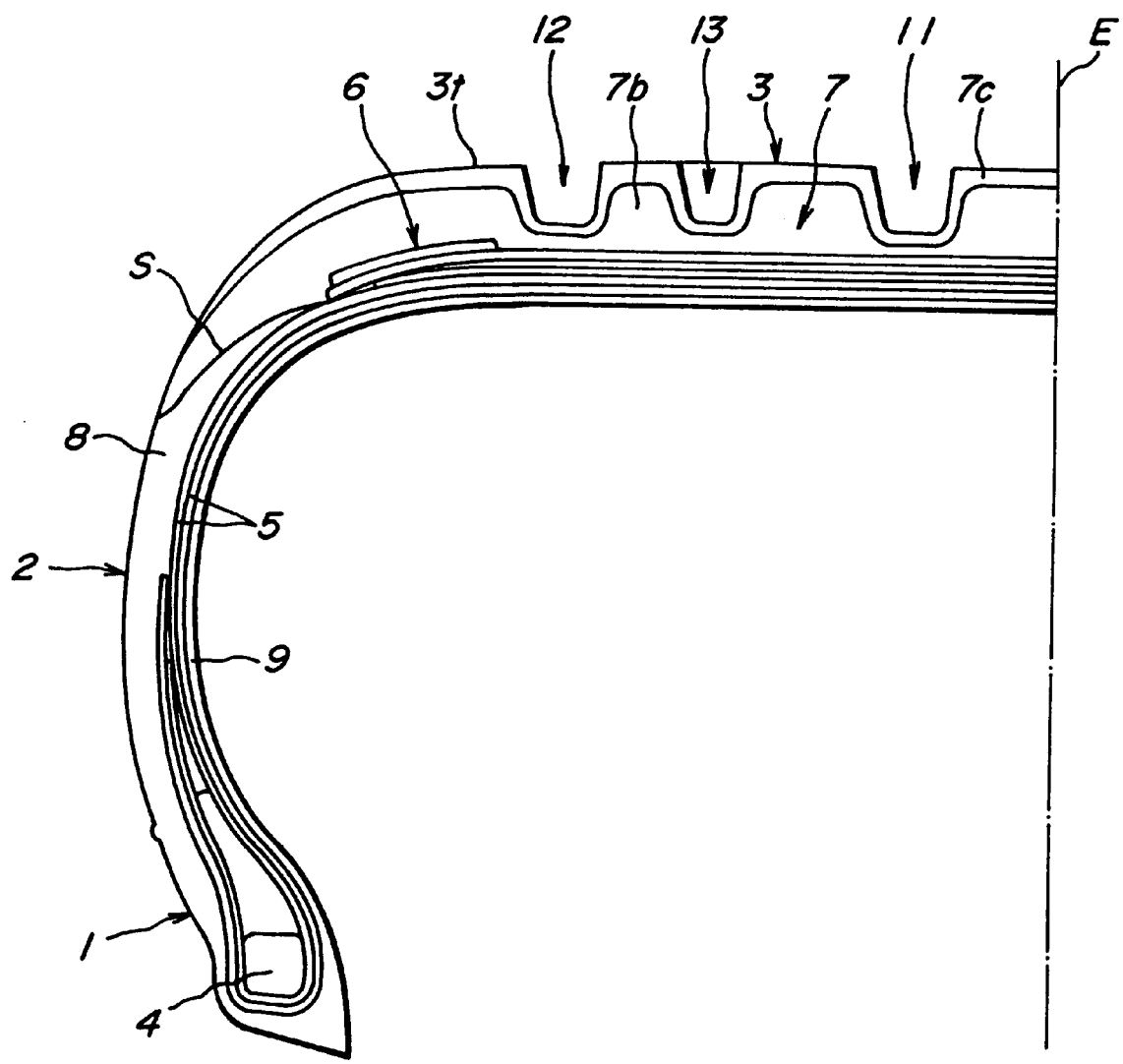
FIG. 1 is a left-half radial section view of an embodiment of the pneumatic tire according to the invention in a plane inclusive of a tire rotating axis.

In FIG. 1, the pneumatic tire comprises a pair of bead portions 1 (only one of them is shown), a pair of sidewall portions 2 (only one of them is shown) and a tread portion 3 toroidally extending between both sidewall portions 2. Moreover, a right half portion of the tire with respect to an equatorial plane E is the same as the left-half portion.

A carcass 5 is illustrated as a case having one or more rubberized plies of radially arranged organic fiber cords (2 plies in the illustrated embodiment), and polyester cord, nylon cord or the like may preferably be used as the organic fiber cord. However, the carcass 5 includes a case that 2 or more rubberized plies of biasedly arranged organic fiber cords are applied in addition to the ply of radially arranged cords though the illustration is omitted.

The carcass 5 extends between a pair of bead cores 4 (only one of them is shown) embedded in the bead portions 1 to reinforce each of the above portions 1–3, and particularly a belt 6 is arranged on an outer periphery of the carcass 5 of the radial ply and the tread portion 3 is reinforced by the belt 6.

The belt 6 comprises two or more steel cord cross layers (2 layers in the illustrated embodiment) and further has one or more wide-width helically wound layer of organic fiber cord such as nylon cord arranged on the outer periphery thereof (so-called cap ply) and one or more narrow-width helically wound layer arranged on the outer periphery of an end portion thereof (so-called layer ply) according to a usual practice, but is possible to have an arrangement of the cap ply or the layer ply alone.

A tread rubber 7 is arranged on a side of a treading surface $3t$ of the tread portion 3. The tread rubber 7 is joined to a sidewall rubber 8 at a piling face S in the vicinity of a shoulder portion. An innerliner 9 is provided on an inner surface of the tire. In case of a tubeless tire, the innerliner 9 is composed of air-impermeable rubber and serves to hold air pressure.

The invention is applicable to both a type forming no groove in the tread rubber 7 or so-called slick tread (tire) type (not shown) and a type forming the grooves. The tire of a type forming the grooves will be described below. In the embodiment of FIG. 1, the tread rubber 7 is provided with grooves 11, 12, 13, in which the grooves 11, 12 are straight grooves extending along a circumference of the treading surface $3t$ and the groove 13 is a slant groove opening to the grooves 11, 12. The shape and arrangement of these grooves are shown in FIG. 2.

FIG. 2 is a profile view of so-called foot print of the treading surface $3t$ obtained when a tire-rim assembly is formed by mounting the tire shown in FIG. 1 onto an approved rim defined according to a standard in each country among JAT standard, TRA standard, ETRTO standard (all edited in 1997) and their supplementary standard and inflated under an air pressure corresponding to a maximum load capacity based on "Table of air pressure-load capacity" described in the above standard and loaded under a load corresponding to the maximum load capacity to vertically push onto a flat plate. The left-half portion of the tire shown in FIG. 1 is a section taken along a A—A line of FIG. 2, so that the tread rubber 7 is provided with a slant groove 14 blinded at its one end and a lateral groove 15 opening to the straight groove 12 and a shoulder portion in addition to the grooves 11, 12 and 13. Moreover, symbol $W_C$ is a ground contact width and symbol $L_C$ is a ground contact length.

The tread rubber shown in FIG. 1 is an example of a structure obtained by laminating a surface layer portion $7c$ located at a side of the tread surface $3t$ including surfaces of the grooves 11, 12, 13 and a base portion $7b$ located at the inside thereof. It is necessary that a rubber composition comprising one or more rubbers selected from natural rubber, polyisoprene rubber, styrene-butadiene copolymer rubber, polybutadiene rubber, acrylonitrile-butadiene copolymer rubber, isoprene-isobutylene copolymer rubber and ethylene-propylene-diene terpolymer rubber and containing a reinforcing agent and a fluorine-based additive having a perfluoroalkyl group containing copolymer is applied to at least a surface layer portion 7c of the tread rubber 7. Naturally, the tread rubber 7 may be formed as one-piece body though the illustration is omitted, and it is possible to apply the above rubber composition to the whole of the tread rubber 7.

In order to shift the speed of causing the hydroplaning phenomenon during the running on wet road surface toward a higher speed side, it is enough to enhance an ability of draining water wedgedly dug into the ground contact zone of the tread rubber during the high-speed rotating of the tire toward the outside of the ground contact zone in a higher efficiency as fast as possible. It need scarcely be said that the groove highly contributes to the drainage efficiency of water. As previously mentioned, therefore, the conventional technique has adopted the discovery on the groove shape and groove arrangement for rendering the drainage efficiency into a maximum or a value near thereto.

However, when the water draining phenomenon was further examined in detail, it has been investigated that since the rate of flowing water in the ground contact zone of the tread rubber during the high-speed rotation is very fast, friction resistance of the flowing water produced between the flowing water and the groove surface contacting therewith largely affects the drainage efficiency. That is, it has been found that as the friction resistance of the groove surface to the flowing water becomes smaller, energy loss of water flowing inside the groove is decreased to drain water toward the outside of the ground contact zone more smoothly and more rapidly.

As a result of further studies, it has been investigated that there is existent a strong reversed interrelation between friction resistance of the groove surface to the flowing water and repelling property of the groove surface. That is, as the repelling property of the groove surface becomes enhanced, the friction resistance of the flowing water is more decreased. This is a reason why the rubber composition comprising one or more rubber selected from the above various rubbers and containing the reinforcing agent and the fluorine-based additive having the perfluoroalkyl group containing copolymer is applied to at least a surface layer portion 7c of the tread rubber 7. Because, this rubber composition has a very high repelling property and the groove surface constituting a part of the surface layer portion 7c develops a lower friction resistance to the flowing water and hence a considerably high drainage property is obtained from the start of using the tread rubber 7 to a wear limit (remaining groove depth: 1.6 mm). Consequently, even in the groove shape and groove arrangement exhibiting the unsatisfactory resistance to hydroplaning as in the conventional technique, when the above rubber composition is applied thereto, satisfactory resistance to hydroplaning can be obtained.

When the rubber composition is applied to the whole of the tread rubber 7, a synergistic effect of adding a low friction resistance of a land portion directly contacting with road surface to the low friction coefficient of the groove from new product to the wear limit of the tread rubber 7 can be obtained and hence the drainage property is more improved.

In a preferable embodiment, silicon oxide such as silica is used in at least a part of the reinforcing agent in the rubber composition, which develops an effect of effectively preventing the degradation of performances due to the compounding of the fluorine-based additive by utilizing a strong adsorption force of silica to the fluorine-based additive and further desirably adding a silane coupling agent to more enhance the bonding force of the fluorine-based additive in the rubber composition through silica.

In another preferable embodiment, aluminum hydroxide is used in at least a part of the reinforcing agent in the rubber composition, which develops an effect of improving the gripping property on wet road surface and quasi-wet road surface at not only low temperature region but also high temperature region.

In the other preferable embodiment, the reinforcing agent in the rubber composition contains carbon black, silica and aluminum hydroxide. In this case, the effect of further improving the above property is obtained without damaging the workability in the kneading of rubber.

Preferable embodiments of the fluorine-based additive having the perfluoroalkyl group containing copolymer will be described in detail below.

At first, the fluorine-based additive is favorable to be oligomer form as a whole and have a molecular weight of 7000–9000. Because, when the molecular weight is within the above range, the additive is a lower polymer as compared with the polymer of the rubber composition (molecular weight is generally several hundred thousands) and as a result, the degree of dispersing the additive in the rubber composition can be improved.

The first fluorine-based additive having the perfluoroalkyl group containing copolymer is a fluorine-based copolymer obtained by reacting acetoacetyl group containing ethylenically unsaturated monomer X with perfluoroalkyl group containing ethylenically unsaturated monomer Y. This fluorine-based copolymer has an advantage that the low-temperature crosslinking property is excellent. As the acetoacetyl group containing ethylenically unsaturated monomer, mention may be made of acetoacetoxyethyl acrylate, acetoacetoxyethyl methacrylate, acetoacetoxyethyl crotonate, acetoacetoxypropyl acrylate, acetoacetoxypropyl methacrylate, acetoacetoxypropyl crotonate, 2-cyanoacetoacetoxyethyl methacrylate, N(2-acetoacetoxyethyl) acrylamide, N-(2-acetoacetoxyethyl) methacrylamide, allyl acetoacetate, vinyl acetoacetate and the like. Among them, acetoacetoxyethyl acrylate and acetoacetoxyethyl methacrylate are preferable.

The acetoacetyl group containing ethylenically unsaturated monomer is generally produced by reacting a functional group containing ethylenically unsaturated monomer with diketene or by ester interchange of this monomer with an acetoacetoxyalkyl ester.

The perfluoroalkyl group containing ethylenically unsaturated monomer Y is not particularly restricted and it is possible to use any well-known and common ones. As the monomer Y, mention may be made of compounds represented, for example, by the general formula (I):

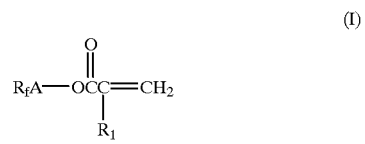

(I)

[wherein $R_f$ is a perfluoroalkyl group having a carbon number of 4–20, $R_1$ is —H or —CH$_3$, A is —Q—, —CON $(R_2)$—Q—, or —$SO_2N(R_2)$—Q— (wherein —Q— is an alkylene group having a carbon number of 1–10, and $R_2$ is an alkyl group having a carbon number of 1–4)].

Concretely, there are exemplified the following monomers:

Y-1: $CF_3(CF_2)_nCH_2CH_2OCOCH=CH_2$
(n=5–11, average of n=9)
Y-2: $CF_3(CF_2)_7CH_2CH_2OCOC(CH_3)=CH_2$
Y-3: $CF_3(CF_2)_5CH_2CH_2OCOC(CH_3)=CH_2$
Y-4: $(CF_3)_2CF(CF_2)_6(CH_2)_3OCOCH=CH_2$
Y-5: $(CF_3)_2CF(CF_2)_{10}(CH_2)_3OCOCH=CH_2$
Y-6: $CF_3(CF_2)_7SO_2N(CC_2H_7)CH_2CH_2OCOCH=CH_2$
Y-7: $CF_3(CF_2)_7SO_2N(CH_{3)CH2}CH_2OCOC(CH_{3)=CH2}$
Y-8: $CF_3(CF_2)_7SO_2N(CH_3)CH_2CH_2OCOCH=CH_2$
Y-9: $CF_3(CF_2)_7(CH_2)_4OCOCH=CH_2$
Y-10: $CF_3(CF_2)_6COOCH=CH_2$
Y-11: $CF_3(CF_2)_7SO_2N(C_4H_9)(CH_2)_4OCOCH=CH_2$
Y-12: $CF_3(CF_2)_7CH_2CH(OH)CH_2OCOCH=CH_2$
Y-13: $CF_3(CF_2)_5CON(C_3H_7)CH_2CH_2OCOC(CH_3)=CH_2$
Y-14: $CF_3(CF_2)_7CON(C_2H_5)CH_2CH_2OCOCH=CH_2$ The second fluorine-based additive having the perfluoroalkyl group containing copolymer is a fluorine-based copolymer obtained by reacting the acetoacetyl group containing ethylenically unsaturated monomer X and the perfluoroalkyl group containing ethylenically unsaturated monomer Y with an ethylenically unsaturated monomer Z copolymerizable therewith.

As the ethylenically unsaturated monomer Z copolymerizable with the acetoacetyl group containing ethylenically unsaturated monomer X and the perfluoroalkyl group containing ethylenically unsaturated monomer Y, mention may be made of monomers such as ethylene, propylene, vinyl chloride, vinylidene chloride, styrene, α-methylstyrene, vinyl acetate, methyl (metha)acrylate, ethyl (metha)acrylate, n-butyl (metha)acrylate, iso-butyl (metha)acrylate, tert-butyl (metha)acrylate, hexyl (metha)acrylate, n-octyl (metha)acrylate, 2-ethylhexyl (metha)acrylate, decyl (metha)acrylate, dodecyl (metha)acrylate, hexadecyl (metha)acrylate, stearyl (metha)acrylate, isostearyl (metha)acrylate, benzyl (metha)acrylate, cyclohexyl (metha)acrylate, isoboronyl (metha)acrylate, dicyclopentanyl (metha)acrylate, dicyclopentenyl (metha)acrylate, methylvinyl ether, propylvinyl ether, octylvinyl ether, butadiene, isoprene, chloroprene, 2-hydroxyethyl (metha)acrylate, (metha)acrylic acid, (metha)acrylamide, N-methylol (metha)acrylamide, 3-chloro-2-hydroxy (metha)acrylate, diacetone acrylamide, and the like.

Among the above copolymerizable ethylenically unsaturated monomers Z, ones having a functional group such as carboxyl group, amino group, amide group, urethane group or the like are unfavorable because such a functional group reacts with acetoacetyl group in the acetoacetyl group containing ethylenically unsaturated monomer X to cause gelation in the polymerization or the reaction proceeds in the storage to shorten the product life, but it is possible to conduct the copolymerization if the amount is very slight.

In order to improve the drainage property of the pneumatic tire aimed at the invention, it is favorable to use a straight-chain or branched-chain alkyl group containing (metha)acrylate having a carbon number of 14–24 represented by the following general formula (II):

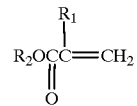

(II)

(wherein $R_1$ is —H or —$CH_3$, and $R_2$ is a straight-chain or branched-chain alkyl group having a carbon number of 14–24).

As a concrete example of the straight-chain or branched-chain alkyl group containing (metha)acrylate having a carbon number of 14–24, mention may be made of n-cetyl (metha)acrylate, n-stearyl (metha)acrylate, n-behenyl (metha)acrylate, iso-strearyl (metha)acrylate and the like.

As the copolymerizable ethylenically unsaturated monomer Z, two or more monomers may be used together. In order to obtain the above copolymer, various polymerization reactions and conditions may optionally be selected, and anyone of various polymerization systems such as block polymerization, emulsion polymerization, suspension polymerization, radiation polymerization, photopolymerization and the like may be adopted.

Further, the fluorine-based additive having the perfluoroalkyl group containing copolymer can directly produce a water-repellant and oil-repellant agent consisting of the above organic solvent type, emulsion type or aerosol type fluorine-based copolymer and at least one of water and organic solvent through solution polymerization or emulsion polymerization. For example, it depends on the production method described in JP-A-7-228638.

Although the copolymerizing ratio of the acetoacetoxy group containing ethylenically unsaturated monomer X to the perfluoroalkyl group containing ethylenically unsaturated monomer Y in the copolymer is not particularly restricted, it is practically favorable that in case of the two-component system of the acetoacetoxy group containing ethylenically unsaturated monomer X and the perfluoroalkyl group containing ethylenically unsaturated monomer Y, the acetoacetoxy group containing ethylenically unsaturated monomer X is within a range of 1–30% by weight and the perfluoroalkyl group containing ethylenically unsaturated monomer Y is within a range of 70–99% by weight. In case of three-component system of the acetoacetoxy group containing ethylenically unsaturated monomer X and the perfluoroalkyl group containing ethylenically unsaturated monomer Y and the ethylenically unsaturated monomer Z copolymerizable therewith, the polymerizing ratio is not restricted likewise the two-component system, but it is practically favorable that the acetoacetoxy group containing ethylenically unsaturated monomer X is within a range of 1–30% by weight and the perfluoroalkyl group containing ethylenically unsaturated monomer Y is within a range of 40–80% by weight and the copolymerizable ethylenically unsaturated monomer Z is within a range of 10–50% by weight.

Even in the production of the copolymer of the monomer X and the monomer Y and the copolymerizable ethylenically unsaturated monomer Z in addition to the two-component system, the copolymerizing ratio of the acetoacetoxy group containing ethylenically unsaturated monomer X to the perfluoroalkyl group containing ethylenically unsaturated monomer Y is particularly important.

Among these monomers, favorable ones are previously mentioned, but from a viewpoint of the availability of starting materials, water-repellant and oil-repellant properties and the like, at least one of acetoacetoxyethyl acrylate and acetoacetoxyethyl methacrylate is preferable as the acetoacetoxy group containing ethylenically unsaturated monomer X, and perfluoroalkyl group containing (metha) acrylate is preferable as the perfluoroalkyl group containing ethylenically unsaturated monomer Y, and straight-chain or branched-chain alkyl group containing (metha)acrylate having a carbon number of 14–24 is preferable as the copolymerizable ethylenically unsaturated monomer Z.

Among the aforementioned fluorine-based additives, Difencer MCF-323SF made by Dainippon Ink & Chemicals, Inc. is preferably used as a commercially available product.

An embodiment of applying the invention to actual two tires will be described below.

A first tire is a pneumatic radial tire for passenger car having a tire size of 225/50R16 and has a structure according to FIG. 1 except that the tread rubber 7 is made from a single compounding composition and groove shape and groove arrangement according to FIG. 2. In the foot print, the ground contact width $W_C$ of the treading surface 3t is 176 mm and the ground contact length $L_C$ is 122 mm. The carcass 5 is comprised of two plies containing polyester cords of 1000D/2, and the belt 6 is comprised of two cross layers of steel cords having 1×5 twisting structure and one cap ply of nylon cords of 1260D/2 and one layer ply of the same cords. In upper row of Table 1 are shown the compounding recipe of the tread rubber 7 in Examples 1, 2, 3 together with that of Comparative Example 1. The numerical value is part by weight. In Example 3, aluminum hydroxide not compounded in Examples 1 and 2 is particularly compounded in an amount of 20 parts by weight. Moreover, properties of these tread rubbers are shown in middle row.

In items described in Table 1, styrene-butadiene rubber has a content of styrene component of 35%;

silica is Nipsil VN3 AQ made by Nippon Silica Co., Ltd.;

fluorine-based additive is a fluoroalkyl group containing oligomer, Difencer MCF-323SF made by Dainippon Ink & Chemicals, Inc.;

vulcanization accelerator NS is Nocceler NS-F made by Ohuchi Shinko Kagaku Kogyo Co., Ltd.;

vulcanization accelerator CZ is Nocceler CZ-G made by Ohuchi Shinko Kagaku Kogyo Co., Ltd.

As to the properties of the tread rubber described in items of Table 1,

JIS hardness is a value measured at a temperature of 25° C. through an A-type spring hardness testing machine according to a method defined in JIS K6301(1994);

tensile strength $T_B$ (kgf/cm$^2$) and 100%. modulus (kgf/cm$^2$) are values measured at a temperature of 25° C. according to JIS K6301(1994) by using a JIS No. 3 test piece and rendering the test piece as an extractable sample into a dumbbell form;

contact angle (degree) is an angle difference of an angle θ measured between a tangent line of a surface of a water droplet placed on a horizontal rubber surface at a size of being hardly influenced by gravity (diameter: about 1 mm) and the rubber surface contacting with the water droplet by means of a contact angle meter as compared with that of Comparative Example 1 (as the angle θ becomes large, the water repelling property becomes higher).

The tires of Examples 1, 2, 3 and Comparative Example 1 as a test tire are mounted onto a test vehicle of a front engine—rear wheel drive system having a displacement of 2500 cc (domestic passenger car) and then the following two tests are carried out by a test driver at a state of two crew members.

(1) Hydroplaning (H. P) generating speed: An initial speed of generating H. P during the running on a test road surface having a water depth of 10 mm is measured by a feeling based on steering response.

(2) Dry steering stability: Straight running, lane-change running and circular turning are carried out on a dry road surface of a test course at a speed within a range of 60–120 km/h and these running results are evaluated by feeling together. The evaluation of the property is carried out by 10 point method using the tire of Comparative Example 1 as a control tire, in which the tires of Examples 1–3 are represented by ±10 stages as compared with the tire of Comparative Example 1. Of course, as the value becomes large at plus side, the property is better. These test results are shown in lower row of Table 1.

TABLE 1

| Items | Comparative Example 1 | Example 1 | Example 2 | Example 3 |
|---|---|---|---|---|
| Styrene-butadiene rubber | 100 | 100 | 100 | 100 |
| Carbon black (ISAF) | 85 | 85 | 65 | 45 |
| Silica | — | — | 20 | 20 |
| Aluminum hydroxide | — | — | — | 20 |
| Aromatic oil | 10 | 10 | 10 | 10 |
| Silane coupling agent | — | — | 2 | 4 |
| Fluorine-based additive | — | 5 | 5 | 5 |
| Stearic acid | 1 | 1 | 1 | 1 |
| Zinc white | 2 | 2 | 2 | 2 |
| Vulcanization accelerator NS | 0.6 | 0.6 | 0.6 | 0.6 |
| Vulcanization accelerator CZ | 1.8 | 1.8 | 1.8 | 1.8 |
| Sulfur | 1.9 | 1.9 | 1.9 | 1.9 |
| SIS hardness (25° C.) | 63 | 65 | 64 | 62 |
| Tensile strength $T_B$ (kgf/cm$^2$) | 213 | 208 | 218 | 234 |
| 100% modulus (kgf/cm$^2$) | 20 | 19 | 21 | 18 |
| Angle difference of contact angle θ (degree) | — | +12.8 | +8.5 | +5.1 |
| H.P generating speed | 87 | 89.5 | 90 | 92 |
| Wet steering stability | 6 | +3 | +4 | +6 |
| Dry steering stability | 5 | +2 | +3 | +4 |

As seen from the results of Table 1, the tire of Comparative Example 1 is not so excellent in the wet steering stability and dry steering stability but also the H. P generating speed is at a lower speed side as compared with those of the tires of Example 1, 2, 3, while the tires of Examples 1, 2, 3 are excellent in the water repelling property of the tread rubber 7 as compared with the comparative example, so that the H. P generating speed is shifted to a higher speed side as compared with the comparative example and hence the high improvement of the wet steering stability is obtained and also the dry steering stability is considerably improved. And also, it has been found that the H. P generating speed and the wet steering stability (wet gripping property) are considerably improved in the order of "carbon black+fluorine-based additive", "carbon black+silica+fluorine-based additive" and "carbon black+silica+aluminum hydroxide+fluorine-based additive". Although the description is omitted in Table 1, when each of the test tires is actually run up to a complete worn state, the occurrence of uneven wear is not observed to a conspicuous extent in any tires and also the difference of wear resistance is not observed among three tires, so that it has been confirmed that the example tires develop satisfactory and excellent property with respect to the wearing.

As a second tire, there are produced tires of Examples 4–6 and Comparative example 2 by using pneumatic tires for cart race having a tire size of 4.0/10.0-15 as a front tire and 6.0/11.0-5 as a rear tire and the tread portion 3 provided with grooves. The carcass 5 is comprised of two plies having a bias structure, and a compounding recipe of a tread rubber composition applied to the tread rubber 7 of the tire is shown in upper row of Table 2.

In items described in Table 2, styrene-butadiene rubber is 0120 (trade name) (content of styrene component: 35%) made by Japan Synthetic Rubber Co., Ltd.;

carbon black SAF has $N_2SA$ of 150 $m^2/g$;

silica is Nipsil VN3 AQ made by Nippon Silica Co., Ltd.;

aluminum hydroxide is Hijilite H-43M (trade name) (average particle size: 0.6 μm) made by Showa Denko Co., Ltd.;

fluorine-based additive is a fluoroalkyl group containing oligomer, Difencer MCF-323SF made by Dainippon Ink & Chemicals, Inc.;

silane coupling agent is Si-69 (trade name) made by DEGUSSA Corp,;

vulcanization accelerator CZ is Nocceler CZ-G (trade name, N-cyclohexyl-2-benzothiazyl-1-sulfenamide);

vulcanization accelerator TOT is Nocceler TOT-N (trade name, tetrakis-2-ethylhexyl thiuram disulfide) made by Ohuchi Shinko Kagaku Kogyo Co., Ltd.

An experiment of running a cart on actual circuit course by using the tires of Comparative Example 2 and Examples 4–6 as a test tire is carried out with respect to the following items (3)–(5).

(3) Wet steering stability: The cart is run on a wet road surface of a cart course (800 m) at a speed of about 65 km/h 10 times, during which the steering stability is evaluated by feeling. The comparison evaluation is according to the same evaluation method as in the test described in the above item (2), in which as the value of evaluation point becomes large at plus side, the property becomes better.

(4) Lap time on wet road surface: It is a best lap time when the cart is run on the wet road surface of the cart course (800 m) 10 times. The smaller the value, the better the property.

(5) Dry steering stability: The cart is run on a dry road surface of a cart course (800 m) at a speed of about 80 km/h 10 times, during which the steering stability is evaluated by feeling. The evaluation is carried out by the same evaluation method as in the above item (3). As the value of evaluation point becomes large at plus side, the property becomes better. The above test results are shown in lower row of Table 2.

TABLE 2

| Items | Comparative Example 2 | Example 4 | Example 5 | Example 6 |
| --- | --- | --- | --- | --- |
| Styrene butadiene rubber | 100 | 100 | 100 | 100 |
| Carbon black (SAF) | 110 | 110 | 110 | 110 |
| Silica | 0 | 0 | 20 | 20 |
| Aluminum hydroxide | 0 | 0 | 0 | 20 |
| Fluorine-based additive | — | 10 | 10 | 10 |
| Silane coupling agent | 0 | 0 | 2 | 4 |
| Aromatic oil | 120 | 90 | 90 | 90 |
| Vulcanization accelerator (CZ) | 1.9 | 1.9 | 1.9 | 1.9 |
| Vulcanization accelerator (TOT) | 1.0 | 1.0 | 1.0 | 1.0 |
| Sulfur | 1.5 | 1.5 | 1.5 | 1.5 |

TABLE 2-continued

| Items | Comparative Example 2 | Example 4 | Example 5 | Example 6 |
| --- | --- | --- | --- | --- |
| Wet steering stability | 6 | +2 | +3 | +4 |
| Lap time on wet road surface (second) | 43.74 | 42.70 | 41.58 | 40.67 |
| Dry steering stability | 5 | +2 | +3 | +3 |

As seen from table 2, the wet steering stability (wet gripping property) is considerably improved in the tires of Examples 4–6 as compared with the tire of Comparative Example 2, which is supported by the fact that the lap time in the circuit running on the wet road surface is largely shortened. At the same time, the dry steering stability is largely improved as compared with Comparative Example 2 in addition to the wet performance, from which it is understood that the similar excellent results are obtained even in a slick tire. Since the tires of Examples 4–6 are racing tires and the results are obtained by running on the circuit course set for racing, it is guaranteed to obtain good results even when the rubber composition described in the previously mentioned embodiments is applied to a racing tire having a larger tire size.

INDUSTRIAL APPLICABILITY

According to the invention, it is not necessary to unwillingly change the groove shape and groove arrangement required for highly developing properties such as steering stability on dry road surface, wear resistance and the like in order to improve the resistance to hydroplaning and hence it is possible to set the groove shape and groove arrangement at a large freedom degree. Consequently, there can be provided pneumatic radial tires having a tread portion capable of establishing the properties such as highly high dry steering stability and excellent resistance to uneven wear and excellent resistance to hydroplaning and wet steering stability based on the high improvement of drainage property, particularly pneumatic radial tires for passenger car and pneumatic racing tires.

What is claimed is:

1. A pneumatic tire comprising a pair of bead portions, a pair of sidewall portions and a tread portion toroidally extending between both the sidewall portions, characterized in that at least a surface layer portion of a tread rubber is a rubber composition comprising one or more rubbers selected from the group consisting of natural rubber, polyisoprene rubber, styrene-butadiene copolymer rubber, polybutadiene rubber, acrylonitrile-butadiene copolymer rubber, isoprene-isobutylene copolymer rubber and ethylene-propylene-diene terpolymer rubber, and a reinforcing agent and a fluorine-based oligomer having a perfluoroalkyl group containing copolymer.

2. A pneumatic tire according to claim 1, wherein at least a part of the reinforcing agent in the rubber composition is silica.

3. A pneumatic tire according to claim 1, wherein at least a part of the reinforcing agent is aluminum hydroxide.

4. A pneumatic tire according to claim 1, wherein the reinforcing agent includes carbon black, silica and aluminum hydroxide.

5. A pneumatic tire according to claim 1, wherein the fluorine-based oligomer having the perfluoro-alkyl group containing copolymer in the rubber composition is a fluorine-based copolymer obtained by reacting an acetoacetyl group containing ethylenically unsaturated monomer (X) with a perfluoroalkyl group containing ethylenically unsaturated monomer (Y).

6. A pneumatic tire according to claim 5, wherein the acetoacetyl group containing ethylenically unsaturated monomer (X) is an acetoacetyl group containing (metha) acrylate.

7. A pneumatic tire according to claim 6, wherein the acetoacetyl group containing (metha)acrylate is at least either acetoacetoxyethyl acrylate or acetoacetoxyethyl methacrylate.

8. A pneumatic tire according to claim 5, wherein the perfluoroalkyl group containing ethylenically unsaturated monomer (Y) is a compound represented by the following general formula (I):

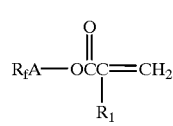

(I)

wherein $R_f$ is a perfluoroalkyl group having a carbon number of 4–20, $R_1$ is —H or —CH$_3$, A is —Q—, —CON(R$_2$)—Q—, or —SO$_2$N(R$_2$)—Q— wherein —Q— is an alkylene group having a carbon number of 1–10, and $R_2$ is an alkyl group having a carbon number of 1–4.

9. A pneumatic tire according to claim 5, wherein a weight ratio of acetoacetyl group containing ethylenically unsaturated monomer (X) to perfluoroalkyl group containing ethylenically unsaturated monomer (Y) is 1~30:70~99.

10. A pneumatic tire according to claim 1, wherein the fluorine-based oligomer having the perfluoro-alkyl group containing copolymer in the rubber composition is a fluorine-based copolymer obtained by reacting an acetoacetyl group containing ethylenically unsaturated monomer (X) and a perfluoroalkyl group containing ethylenically unsaturated monomer (Y) with an ethylenically unsaturated monomer (Z) copolymerizable therewith.

11. A pneumatic tire according to claim 10, wherein the copolymerizable ethylenically unsaturated monomer (Z) is a straight-chain or branched-chain alkyl group containing (metha)acrylate having a carbon number of 14–24.

12. A pneumatic tire according to claim 11, wherein the straight-chain or branched-chain alkyl group containing (metha)acrylate having a carbon number of 14–24 is a compound represented by the following general formula (II):

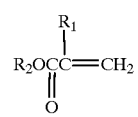

(II)

wherein $R_1$ is —H or —CH$_3$, and $R_2$ is a straight-chain or branched-chain alkyl group having a carbon number of 14–24.

13. A pneumatic tire according to claim 10, wherein a weight ratio of acetoacetyl group containing ethylenically unsaturated monomer (X) to perfluoroalkyl group containing ethylenically unsaturated monomer (Y) to ethylenically unsaturated monomer (Z) copolymerizable therewith is 1~30:40~80:10~50.

* * * * *